United States Patent
Holt et al.

(10) Patent No.: US 6,820,115 B1
(45) Date of Patent: Nov. 16, 2004

(54) APPARATUS AND METHOD FOR MEDIATING MESSAGE TRANSMISSION ACROSS A NETWORK

(75) Inventors: Robert H. Holt, Nepean (CA); Marie C. Hattar, Toronto (CA); James Wimberley, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 51 days.

(21) Appl. No.: 10/216,505

(22) Filed: Aug. 9, 2002

Related U.S. Application Data (63) Continuation of application No. 09/289,522, filed on Apr. 9, 1999, now abandoned.

(51) Int. Cl.[7] ............................. G06F 15/16; G06F 3/00
(52) U.S. Cl. ................... 709/218; 709/219; 379/90.02; 379/93.16; 710/17
(58) Field of Search ............................... 709/225, 224, 709/227, 229, 232, 249, 217, 218, 219; 379/90.02, 231, 93.16, 230, 235, 236; 710/107, 36, 93.02

(56) References Cited

U.S. PATENT DOCUMENTS

| | | | | |
|---|---|---|---|---|
| 5,285,449 A | * | 2/1994 | Georgiou | 370/360 |
| 5,495,475 A | * | 2/1996 | Franaszek et al. | 370/389 |
| 5,519,695 A | * | 5/1996 | Purohit et al. | 370/352 |
| 5,781,800 A | * | 7/1998 | Koyama | 710/40 |
| 5,819,112 A | * | 10/1998 | Kusters | 710/36 |
| 6,011,910 A | * | 1/2000 | Chau et al. | 709/229 |
| 6,047,319 A | * | 4/2000 | Olson | 709/223 |
| 6,098,142 A | * | 8/2000 | Leggett et al. | 710/220 |
| 6,122,255 A | * | 9/2000 | Bartholomew et al. | 370/237 |
| 6,151,297 A | * | 11/2000 | Congdon et al. | 370/216 |

OTHER PUBLICATIONS

Relief in on the way: Ascend's SS7 to ease dialup, Telephony Online, Primedia Pub., Nov. 1998, pp. 1–2.*
Telephony Online, Relief is on the way: Ascend's SS7 to ease dial–up congestion, Hurley, H., Primedia Pub., Nov. 1998, pp. 1–2.*
Using Camp–on to Improve the performance of Fibre Channel Switch, Varma, A., Bryant, R., IEEE 0742–1303/93, 1933, pp. 247–255.*
Callback feature for X.21 Shorthold Mode/Port Sharing, IBM Technical Disclosure Bulletin, TDB# NN8607652, vol. 29, Issue 2, Jul. 1986, pp. 1–2.*

* cited by examiner

Primary Examiner—Jack B. Harvey
Assistant Examiner—Beatriz Prieto
(74) Attorney, Agent, or Firm—Withrow & Terranova, PLLC (57) ABSTRACT

An apparatus and method of mediating data flow across a network from a network switching system to a server utilizes a control message that limits repeated attempts to access a busy server port. To that end, it first is determined if the server port is available so that a control message can be generated reflecting the determined availability of the server port. If the server port is determined to be not available, then the control message is generated to include command data commanding the network switching system to not transmit data to the server port until receipt of another control message having control data indicating that the server is available. In contrast, if the server port is determined to be available, then the control message is generated to include control data indicating that the server port is available. Once generated, the control message is forwarded to the network switching system.

18 Claims, 5 Drawing Sheets

APPARATUS AND METHOD FOR MEDIATING MESSAGE TRANSMISSION ACROSS A NETWORK

CROSS-REFERENCE TO RELATED APPLICATION

The present application is a continuation of U.S. application Ser. No. 09/289,522, filed Apr. 9, 1999, now abandoned.

This patent application may be related to the following commonly-owned United States patent application:

U.S. patent application Ser. No. 08/997,799 entitled, "Control in a Data Access Transport Service", the disclosure of which is incorporated herein, in its entirety, by reference.

FIELD OF THE INVENTION

The invention generally relates to networks and, more particularly, the invention relates to mediating data transmission across a network.

BACKGROUND OF THE INVENTION

Current networking technology enables end-users to connect their personal computers to the Internet via an Internet Service Provider ("ISP"). To that end, end-users typically connect their personal computers to a modem that modulates packetized data in an analog signal to the ISP. The modem uses the well known Public Switched Telephone Network ("PSTN") to connect to a corresponding modem port on a remote server of the ISP. Upon receipt of end-user data through the corresponding modem port, the ISP demodulates and routes the packetized data to a selected destination (e.g., a selected World Wide Web page) based upon routing information embedded in the data.

The total number of modem ports on a server for receiving end-user data typically is limited. For example, the server of a given ISP may have only twenty ports for receiving data from the PSTN. When all ports are used by other users (e.g., other end users accessing the Internet via the given ISP), the server returns an unavailable message to the PSTN indicating that there are no available ports on the server to receive the data. An end-user then may repeatedly attempt to access the server until one of the ports becomes available.

Transmitting unsuccessful port requests and their corresponding unavailable messages between the PSTN and server unnecessarily adds data traffic to the network. Moreover, after making the port request but prior to receipt of an unavailability message, the PSTN commonly attempts to reserve bandwidth on the connecting trunk between the PSTN and the server. Although relinquished upon receipt of the unavailability message, this reserved bandwidth can slow data flow across this network. In addition, the PSTN executes unnecessary processing steps in attempting to reserve the bandwidth. Accordingly, the process of requesting access to an unavailable modem port on a server is an inefficient utilization of network resources.

SUMMARY OF THE INVENTION

In accordance with one aspect of the invention, an apparatus and method of mediating data flow across a network from a network switching system to a server utilizes a control message that limits repeated attempts to access a busy server port. To that end, it first is determined if the server port is available so that a control message can be generated reflecting the determined availability of the server port. If the server port is determined to be not available, then the control message is generated to include command data commanding the network switching system to not transmit data to the server port until receipt of another control message having control data indicating that the server is available. In contrast, if the server port is determined to be available, then the control message is generated to include control data indicating that the server port is available. Once generated, the control message is forwarded to the network switching system.

In some embodiments, the server is polled to determine if the server port is available. In other embodiments, the availability of the server port is determined by receiving an unsolicited status message that originates from the server. The status message includes data indicating if the server port is available. After being received by the network switching system, data in the control message preferably controls the network switching system to not transmit data to the server port until receipt of a control message indicating that the port is available.

In preferred embodiments, a request message is received from the network switching system requesting access to the server port. This message may be received by a mediating unit that is either a part of the network switching system, a part of the server, or an intermediate unit between the network switching system and server. An access message responsively is forwarded to the server requesting access to the server port. A reply message then is received from the server indicating if the server port is available. The availability of the server port may be determined by counting, over a preselected time interval, the total number of consecutive reply messages from the server indicating that the server port is not available. Forwarding of the control message with the command data then is delayed until the total number of consecutive reply messages from the server over the preselected time interval exceeds a preselected number. In some embodiments, the control message is transmitted to the network switching system in lieu of reply messages. The preselected time interval preferably is reset if a reply message is received in the preselected time interval indicating that the server port is available.

In accordance with other aspects of the invention, a policy manager for mediating access by a network switching system to a server port on a server also utilizes command messages to limit repeated attempts to access a busy server port. Specifically, the policy manager includes port availability logic that monitors use of the server port. While monitoring the server port, the port availability logic determines if the server port is available. If not available, then a message generator that is coupled to the port availability logic responsively generates a command message commanding the network switching system to not transmit data to the server until receipt of a control message having control data indicating that the server is available. The policy manager thus transmits the command message toward the network switching system via an output.

In other embodiments, the message generates a control message indicating that the server port is available when the port availability logic determines that the server port is available. Accordingly, when generated, a control message is forwarded to the network switching system via the output.

In preferred embodiments, the policy manager includes an input that receives request messages from the network switching system requesting access to the server port. In response to receipt of at least one request message, the message generator generates a reply message denying access to the server port each time the port availability logic determines that the server port is unavailable. The policy manager also may include a timer that sets a preselected time interval, a counter that counts the total number of reply messages generated over the preselected time interval, and command message transmission logic that delays transmission of the control message toward the network switching system until the total number of reply messages generated over the preselected time interval exceeds a preselected number. In some embodiments, the network switching system is a part of an advanced intelligent network.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
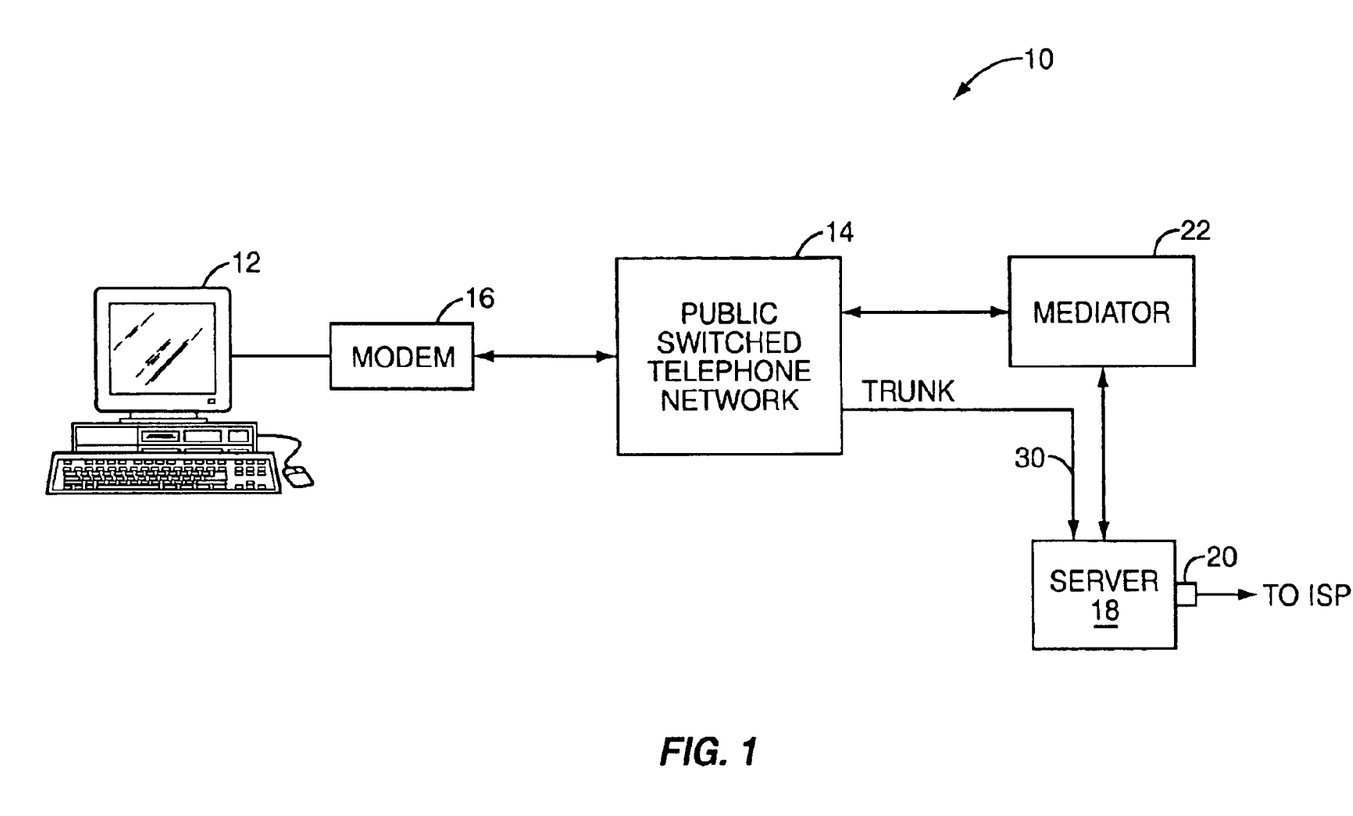
FIG. 1 schematically shows a simplified network arrangement that may be utilized in accord with preferred embodiments of the invention to reduce repeated attempts at accessing an unavailable server port.

FIG. 1 schematically shows a simplified network arrangement ("network 10") that may be utilized in accord with preferred embodiments of the invention to reduce repeated attempts at accessing an unavailable server port. Among other things, the network 10 provides a communication channel between a local computer system 12 and a remote Internet service provider ("ISP"). As is known in the art, once in communication with the ISP, the local computer system 12 can access other computer systems via the Internet (e.g., the World Wide Web).

The network 10 includes the local computer system 12, which is coupled with a public switched telephone network ("PSTN 14") via an attached modem 16. The computer system 12 may be any computer system, such as an IBM THINKPAD 701® computer (distributed by International Business Machines of Armonk, N.Y.). As discussed in greater detail below, the PSTN 14 includes the hardware and software to deliver data messages (e.g., IP packets) from the computer system 12 to a remote server 18. In preferred embodiments, these messages are delivered via a time division multiplexed channel for the duration of a given session. The server 18 includes a plurality of ports 20 and accompanying logic that translate received data messages from the PSTN 14 (i.e., messages from the computer system 12), and then transmit such messages to the ISP. In accord with preferred embodiments of the invention, the network 10 also includes a mediator 22 that controls access to the server ports 20.

Figure 2:
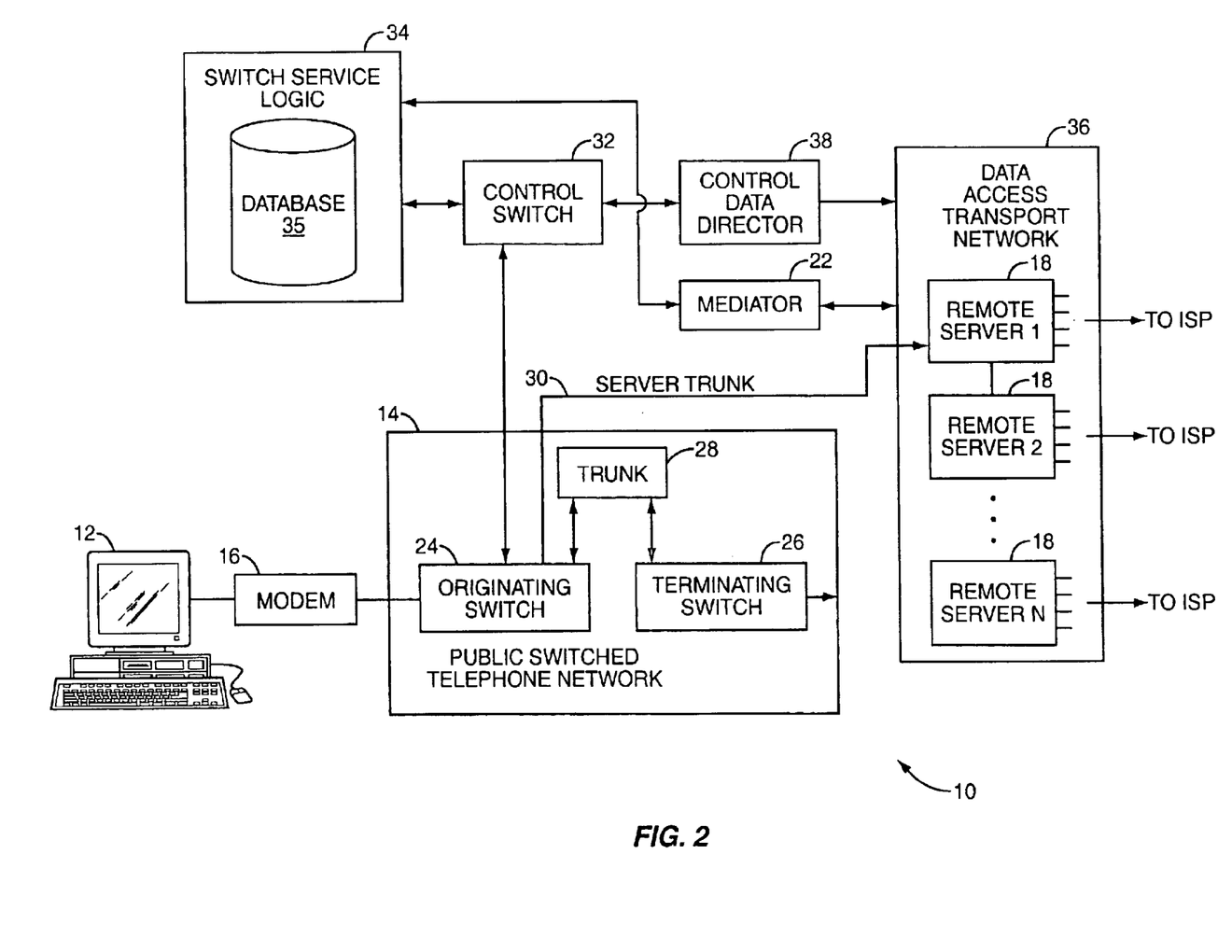
FIG. 2 schematically shows a more detailed network arrangement that may be utilized in accord with preferred embodiments of the invention.

FIG. 2 shows additional details of the network 10 shown in FIG. 1. Specifically, the PSTN 14 includes an originating switch 24 that receives data messages from the computer system 12, a terminating switch 26 that terminates data messages, and a trunk 28 that couples the two switches. As known in the art, the trunk 28 may include intermediate tandem switches. The originating switch 24 and terminating switch 26 may be any switch known in the art for such purposes, such as a class 5 switch commonly utilized in current PSTN systems. The originating switch 24 includes an analog to digital interface to convert received data signals into digital form, and an output to forward the digital data (i.e., data messages) to the server 18 via a server trunk 30. As discussed below, use of the server trunk 30 eliminates the need for transmitting data messages to the server 18 via the terminating switch 26. In some embodiments, however, the terminating switch 26 may be utilized to transmit data messages.

Although not shown in FIG. 1, the network 10 also includes a control switch 32 that receives control messages from the originating switch 24, and switch service logic ("service logic 34") that receives the control messages from the control switch 32 and notifies the originating switch 24 of an accessible port 20 on the server 18. More particularly, the service logic 34 first parses each received control message from the originating switch 24 to determine the identity of an ISP being requested. Once the identity is determined, the service logic 34 transmits a return message to the originating switch 24 with data indicating whether a port 20 on the server 18 is available for such ISP. If the data in the return message indicates that a port 20 for a requested ISP is available, then the originating switch 24 transmits data messages to such port 20 via the server trunk 30. In preferred embodiments, the control switch 32 is a Signaling System No. 7 network switch (also known as an "SS7" switch), and the service logic 34 is an Advanced Intelligent Network device (also known as an "AIN" device) having a database 35 identifying each ISP with a port 20 on the server 18. Among many types of service logic 34, the service logic 34 may be a SERVICEBUILDER SCP™ switch service logic device, available from Northern Telecom Limited of Brampton, Ontario, Canada.

The server 18 preferably is a part of a data access transport network ("DATS 36"). As known in the art, a DATS 36 includes at least one or more remote access servers 18 that each include ports 20 for one or more ISPs. To save significant capital costs, ISPs commonly rent one or more ports 20 from a DATS 36 instead of owning their own dedicated remote access server 18. Such remote access server 18 can comprise, for example, the CVX 1800™ Access Switch, available from Northern Telecom Limited.

The DATS 36 preferably has an associated control data director 38 that analyzes received control data from the service logic 34 (via the control switch 32), and updates the DATS 36 with such control data indicating, among other things, the type of data to be received from the originating switch 24 (e.g., ISDN data via the server trunk 30), and the ISP to receive the data. After being updated by the data director 38, the DATS 36 directs data received from the originating switch 24 (via the server trunk 30) to the appropriate remote access server port 20. In preferred embodiments, the control data director 38 is a CVX SS7™ Gateway, available from Northern Telecom Limited As noted above, the mediator 22 controls access to the server ports 20 on each of the remote access servers 18. In preferred embodiments, the mediator 22 is a CVX Policy Manager™ (also available from Northern Telecom Limited) that is specially configured to cooperate with the service logic 34 to reduce repeated attempts at accessing an ISP whose ports 20 in the DATS 36 are unavailable. Details of this cooperation are discussed below with reference to FIGS. 3–5.

Figure 3:
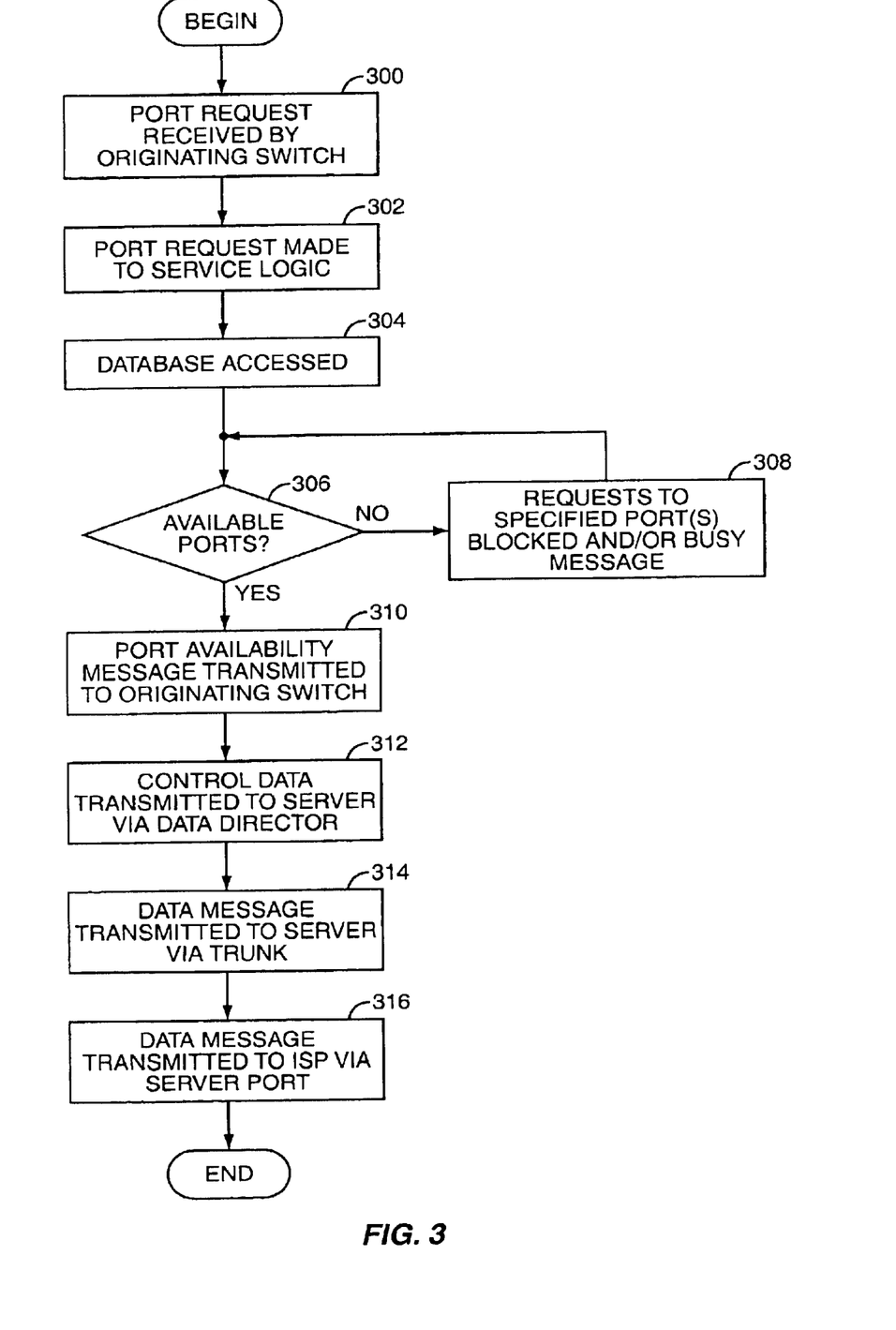
FIG. 3 shows a preferred process of transmitting a message from a computer to an Internet service provider across the networks shown in FIGS. 1 and 2.

In particular, FIG. 3 shows a preferred process of transmitting a message from the computer system 12 to a given ISP across the network 10 shown in FIGS. 1 and 2. The process begins at step 300 in which a port request is received by the originating switch 24 from the computer system 12. In preferred embodiments, the port request includes a unique string identifying an ISP ("requested ISP") that is being requested by the computer system 12. The unique string may be a telephone number that is local to the computer system 12. The port request may be incorporated into the header of data packets transmitted to the originating switch 24 by the computer system 12. Upon receipt of the port request, the originating switch 24 responsively makes a similar port request (in a control message) to the service logic 34 via the control switch 32 (step 302).

Upon receipt of the port request, the service logic 34 accesses its local database 35 to determine the identity of the requested ISP (step 304). For example, the local database 35 may include a look-up table that identifies the requested ISP based upon the unique string in the port request. The look-up table may include data identifying the specific identity and location of the DATS 36 utilized by the requested ISP.

The process then continues to step 306 in which it is determined if the remote access server(s) 18 on the DATS 36 utilized by the requested ISP have any available ports 20 at that time. A preferred process of determining if any such ports 20 are available utilizes the mediator 22 and service logic 34, and is discussed in detail below with regard to FIGS. 4 and 5. Accordingly, if no such ports 20 are available, then the process continues to step 308 in which requests to such port(s) 20 are blocked, and/or a busy message is transmitted to the originating switch 24 (via the service logic 34) indicating that no such ports 20 are available. If requests to such ports 20 are blocked at step 308, then the mediator 22 transmits a command message (discussed below) to the service logic 34 commanding the service logic 34 to block any attempts at accessing the requested ISP's ports 20. The service logic 34 responsively stores such state (e.g., in a one bit state register, or a memory device) and does not transmit a reply message to the originating switch 24 permitting access to the DATS 36. As is known in the art, when utilized with an advanced intelligent network system, the originating switch 24 typically does not begin transmitting data messages to the DATS 36 until it receives a reply message from the service logic 34 with both the identity of an available port 20 for the requested ISP, and confirmation that such port 20 is available.

Accordingly, when blocked, a subsequent request to the requested ISP by any computer system 12 does not responsively cause the service logic 34 to check port availability via the mediator 22 or the DATS 36. Omitting the mediator 22 and DATS 36 from this process significantly saves system resources. Any port request requesting a port 20 of any blocked ISP thus is denied until the service logic 34 receives data indicating that such a port 20 is available. The service logic 34 also may transmit a busy message to the requesting computer system 12.

Returning to step 306, if it is determined that at least one such port 20 is available, then the process continues to step 310 in which a port availability message is transmitted to the originating switch 24. In addition to indicating that a port 20 is available on the DATS 36 for the requested ISP, the port availability message may include DATS specific data that subsequently enables the DATS 36 to route received data messages to the appropriate server port 20.

The process then continues to step 312 in which control data is transmitted to the remote access server 18 for the requested ISP via the control data director 38. The originating switch 24 also may transmit the data message(s) to such server 18 via the server trunk 30 (step 314). The data message(s) then may be transmitted to the ISP via the appropriate server port 20 on the remote access server 18 (Step 316), thus completing the process. It should be noted that in a manner similar to FIGS. 4 and 5, various steps of the process shown in FIG. 3 may be executed in a different order than that described.

Figure 4:
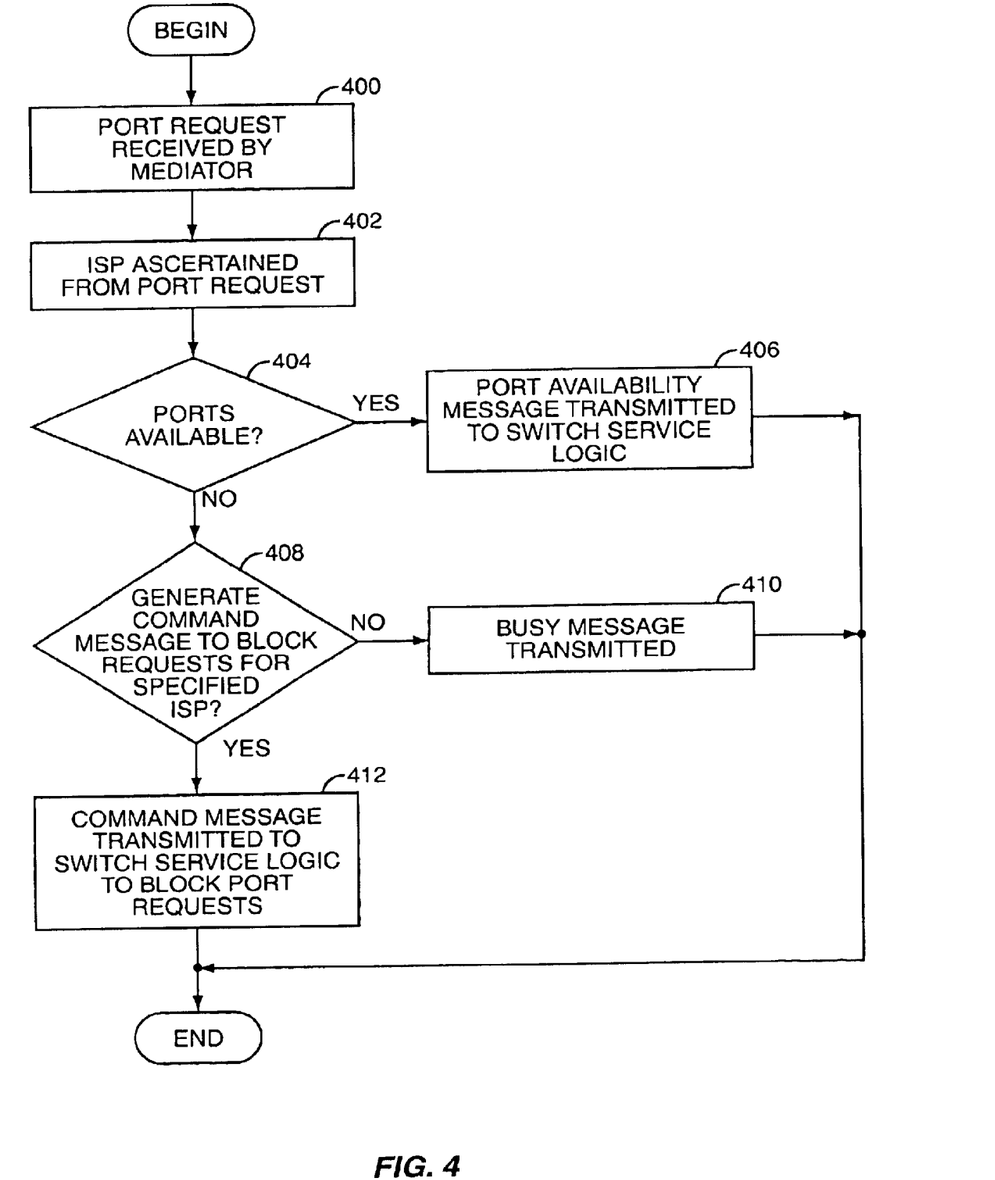
FIG. 4 shows a preferred process utilized by a mediator shown in FIGS. 1 and 2 for determining the availability of a port of a specified Internet service provider.

FIG. 4 shows a preferred process utilized by the mediator 22 for determining the availability of a port 20 of a specified ISP. The process begins at step 400 in which a port request is received by the mediator 22. As noted above, the ISP is ascertained from the port request (step 402). It then is determined at step 404 if any ports 20 on the DATS 36 for the requested ISP are available. To do this, the mediator 22 may do a single check to determine if any such port 20 is available. See FIG. 5, however, for a preferred method of determining port availability. If a port 20 is available, then the process continues to step 406 in which a port availability message is transmitted to the service logic 34. A port availability message preferably includes data indicating that one such port 20 is available on the DATS 36. The service logic 34, as discussed with reference to FIG. 3, responsively transmits a port availability message to the originating switch 24, thus permitting access by the computer system 12.

Returning to step 404, if no ports 20 are available, then the process continues to step 408 in which it is determined if a command message is to be generated to block requests for the specified ISP. In a manner similar to step 404, FIG. 5 discusses a preferred process of determining if a command message is to be generated. If no command message is to be generated, then the process continues to step 410 in which the mediator 22 transmits a busy message to the service logic 34. The service logic 34 responsively transmits a busy message to the originating switch 24, and ultimately to the computer system 12, indicating that no ports 20 are available. The computer system 12 again may attempt to contact the ISP at any subsequent time.

Returning to step 408, if it is determined that a command message is to be generated, then the mediator 22 transmits the command message to the service logic 34 (step 412). The service logic 34 responsively sets its register or other call block recording mechanism, thus not permitting access to the remote access server 18 of the ISP by any requesting computer system 12 (including the currently requesting computer system 12). In some embodiments, the service logic 34 transmits a busy message to the originating switch 24. In other embodiments, the service logic 34 merely waits until a port 20 is available, and then transmits a port availability message at that time. The service logic 34 may determine when a port 20 is available by polling the mediator 22, or by waiting for an unsolicited notification message from the DATS 36 and/or the mediator 22 indicating that such a port 20 is available.

Figure 5:
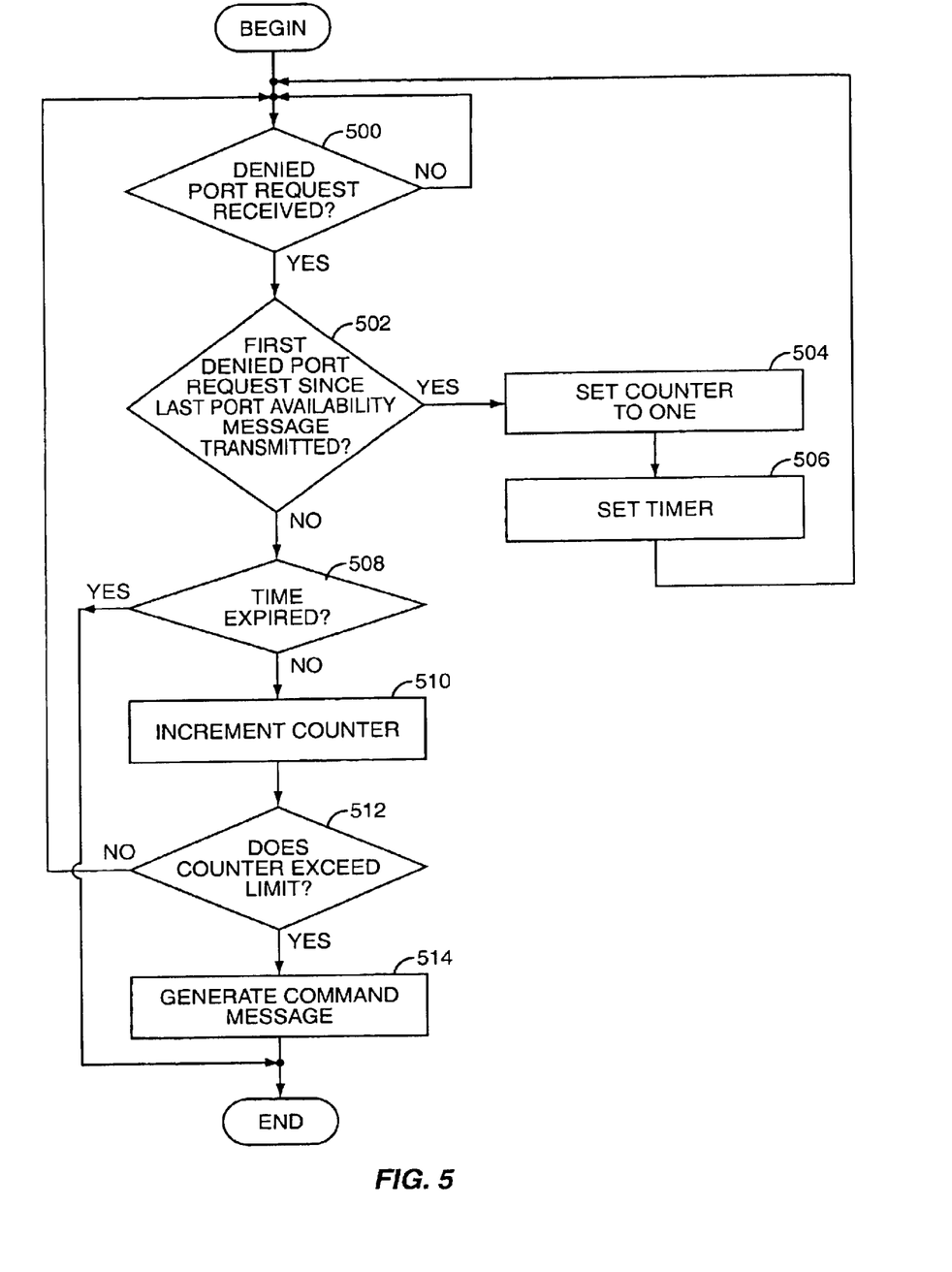
FIG. 5 shows a preferred process of generating a command message that reduces repeated attempts at accessing an unavailable port.

In preferred embodiments, several consecutive attempts over a preselected time interval are made to access a requested ISP before port requests for such ISP are blocked. For example, the mediator 22 and service logic 34 may be preconfigured to require six consecutive unsuccessful port requests in a ten minute time interval prior to blocking subsequent port requests to a requested ISP. To that end, FIG. 5 shows a preferred process of generating command messages that require several unsuccessful port requests prior to blocking subsequent access attempts. The process begins at step 500 in which it is determined if a denied port request is received by the mediator 22. If not, then the process waits until one is received. Once such request is received, then the process continues to step 502 in which it is determined if such received request is the first denied port request for the requested ISP received since the last port availability message for the requested ISP was received. If it is the first denied port request, then a counter is set to one (step 504), and a timer is set to begin counting a preselected time interval (step 506). The process then loops back to step 500 until another denied port request is received.

Returning to step 502, if the received denied port request is not the first denied port request, then the process continues to step 508 in which it is determined if the time interval set in step 506 has expired. If expired, the process ends, thus effectively resetting the time interval. If time has not expired, however, then the counter is incremented by one (step 510). The process then continues to step 512 in which it is determined if the counter value exceeds a preconfigured maximum limit. Specifically, it is determined if the total number of denied port requests is greater than the preset limit. If it does not exceed the limit, then the process loops back to step 500, thus waiting until another denied port request is received. If, however, the limit is exceeded, then the process continues to step 514 in which the command message is generated.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of reducing traffic on a network, comprising:
   determining with a mediator if a server has any available ports;
   precluding a port request to a server if the determining determines that there are no server ports available until receipt of a control message indicating that a server port is available, said port request comprising a request for access to a server port from a remote client; and
   allowing access to the server ports at the server across the network if the determining determines that there is at least one server port available.

2. The method of claim 1 wherein determining with a mediator comprises determining with a mediator remotely positioned from the server.

3. The method of claim 1 wherein precluding a port request to a server comprises instructing a switch service logic to refuse requests for access until a server port available control message is sent to the switch service logic.

4. The method of claim 3 further comprising updating a database associated with the switch service logic as to availability of server ports on the server.

5. The method of claim 4 further comprising consulting the database prior to precluding the port request to the server.

6. The method of claim 1, wherein said determining if a server port has any available ports comprises polling the server to determine if a server port is available.

7. The method of claim 1 further comprising receiving the port request from across the PSTN.

8. The method of claim 7 further comprising generating a reply message indicating if any server port is available.

9. The method of claim 8 wherein the step of determining comprises:
   counting, over a preselected time interval, the total number of consecutive reply messages from the server indicating that the server port is not available; and
   delaying issuing a control signal that precludes requests for access to server ports at the server across at least a portion of the network until the total number of consecutive reply messages received from the server over the preselected time interval exceeds a preselected number.

10. The method of claim 9 wherein the preselected time interval is reset if a reply message is received in the preselected interval indicating that the server port is available.

11. The method of claim 7 further comprising connecting the remote client to an ISP through the server after connecting the remote client to the server port after an indication of port availability.

12. A mediator that reduces network traffic between a server with a server port and a remote client, the mediator comprising:

an input coupled to the server and receiving messages from the server about server port availability;

message generating logic adapted to analyze the messages from the server about server port availability and generate a control message, said control message instructing a switch service logic to preclude access requests to the server across at least a portion of the network if no server ports are available until receipt of another control message indicating server port availability; and said control message indicating availability of a server port if a server port is available; and an output operatively coupled with the message generating logic, the output forwarding the control message to the switch service logic.

13. The mediator of claim 12, further comprising polling logic that polls the server to determine if a server port is available.

14. The mediator of claim 12, further comprising a counter that counts, over a preselected time interval, a total number of consecutive reply messages from the server indicating server port unavailability;

said control message not being sent until said counter reaches a predetermined number within the preselected time interval representing a plurality of failed attempts to secure access to a server port.

15. The mediator of claim 14 wherein the preselected is reset if a reply message is received in the preselected time interval indicating that the server port is available.

16. The mediator of claim 12 further comprising a receiver that receives, from the server, an unsolicited status message having data indicating if a server port is available.

17. A system for reducing traffic across a network, comprising:

a server comprising one or more server ports that allow access to an ISP;

a mediator comprising a logic that polls said one or more server ports to determine if any server ports are available;

a switch service logic that deciphers access requests from clients and determines a requested ISP from the access requests;

a switch that transfers the access request from a client to the switch service logic;

said access request causing said mediator to poll the server ports to determine availability of said server ports, said mediator generating a control signal and forwarding the control signal to the switch service logic, said control signal comprising an indication of availability of said one or more server ports;

said switch service logic precluding requests for access to server ports at the server across at least a portion of the network if the control signal indicates that there are no server ports available; and said switch service logic allowing access to the server ports at the server across the network if the control signal indicates that there is at least one server port available.

18. A method of reducing traffic on a network, comprising:

determining through a port request from a first process if a server has any available ports;

precluding a port request to a server from a second process if the determining determines that there are no server ports available until receipt of a control message indicating that a server port is available, said port request comprising a request for access to a server port from a remote client; and allowing access to the server ports at the server across the network if the determining determines that there is at least one server port available.

* * * * *